June 4, 1935.  E. W. NORTH  2,004,054
ILLUMINATED MIRROR
Filed July 9, 1934  3 Sheets-Sheet 1
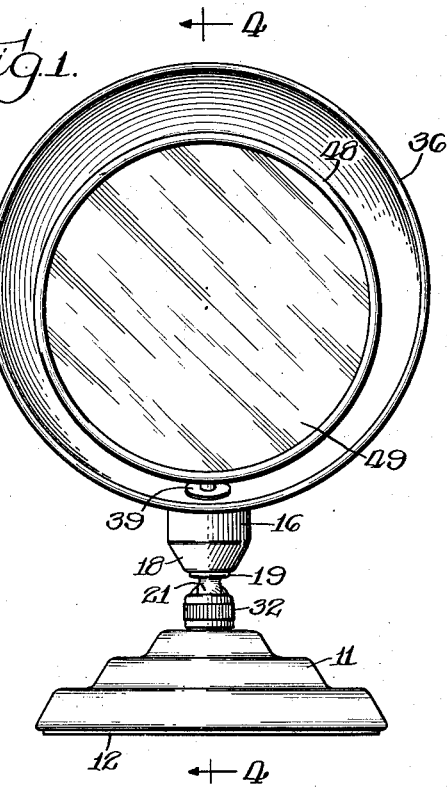
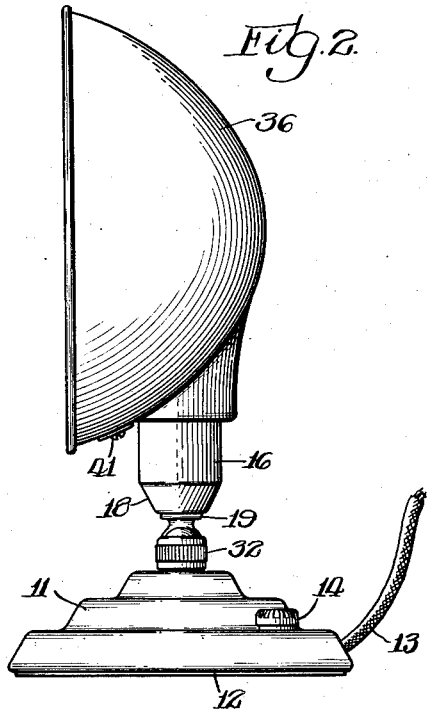
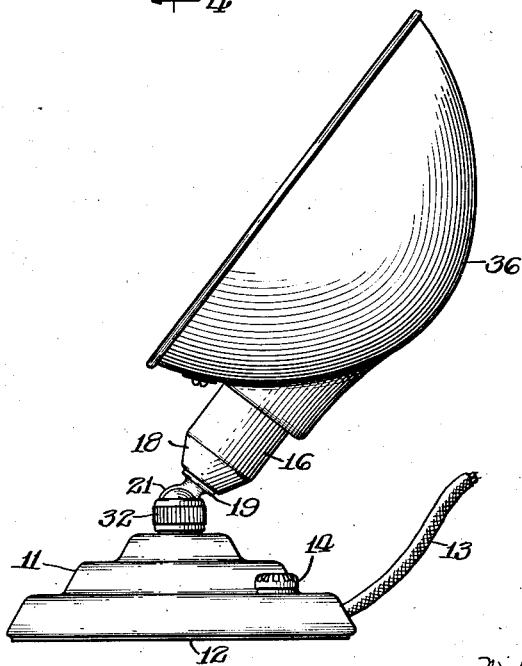
INVENTOR.
Edwin W. North,
BY
Wilson, Dowell, McCanna & Foley
ATTORNEYS

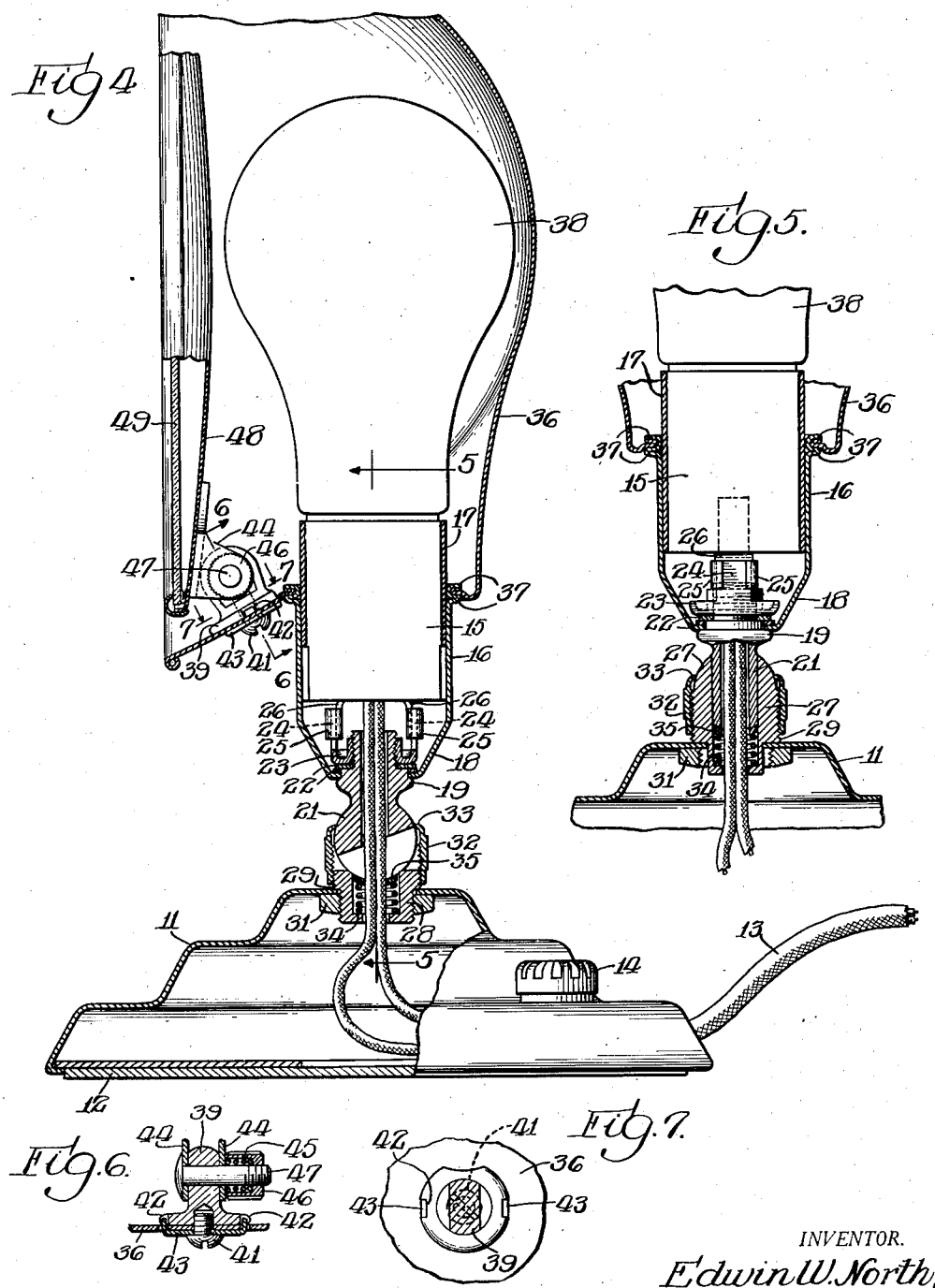

June 4, 1935. E. W. NORTH 2,004,054
ILLUMINATED MIRROR
Filed July 9, 1934 3 Sheets-Sheet 3
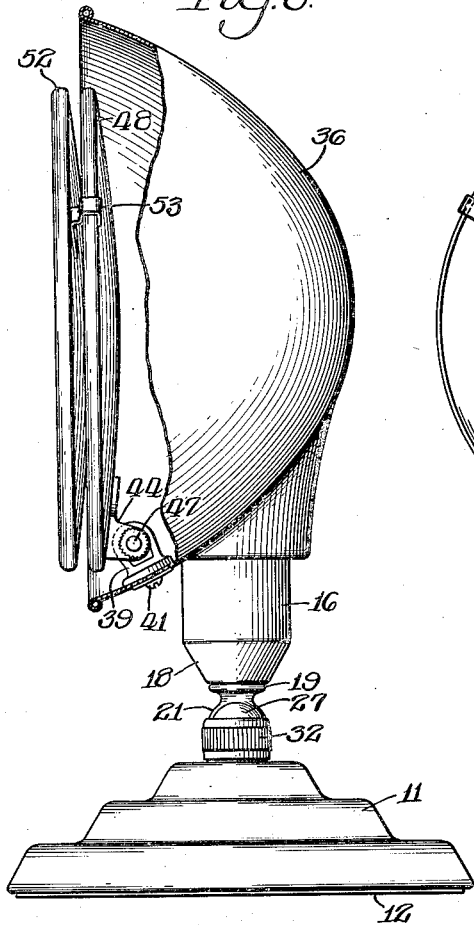
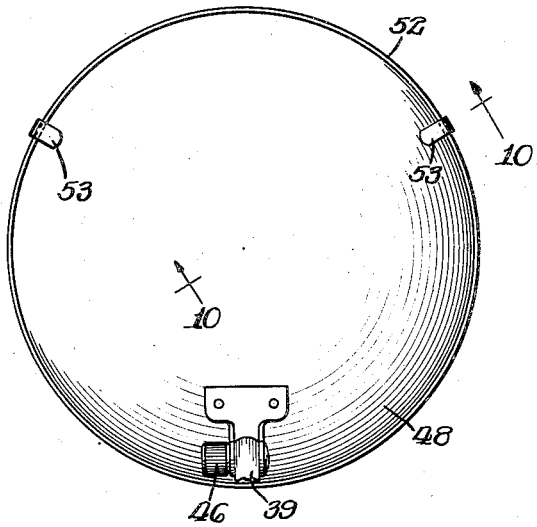
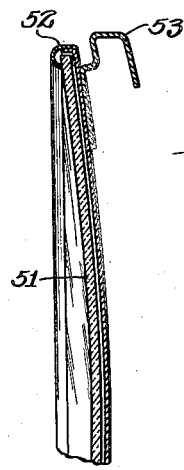
INVENTOR.
Edwin W. North,
BY
Wilson, Dowell, McCanna & Foley
ATTORNEYS Patented June 4, 1935

2,004,054

UNITED STATES PATENT OFFICE 2,004,054

ILLUMINATED MIRROR

Edwin W. North, Rockford, Ill., assignor to National Lock Co., Rockford, Ill., a corporation of Delaware Application July 9, 1934, Serial No. 734,275

6 Claims. (Cl. 240—4.2)

This invention relates to a combination mirror and lamp so constructed and arranged that it will illuminate the face of the user or other object which is to be reflected in the mirror, while at the same time obscuring the source of light and shutting off the direct transmission of rays therefrom to the object to be reflected.

The article is capable of many uses, but is particularly adapted for shaving purposes or for use by actors and actresses in applying their make-up. Because of this it is frequently referred to as a make-up lamp.

Among the various purposes and advantages of my invention, the following are worthy of mention. The lamp is designed to afford a suitable base so that it cannot be readily upset and the lamp and mirror are adjustably supported on the base so that they, as a unit, may be swung forwardly and backwardly to dispose them at any angle which will be most convenient for the user, in which position they will be automatically retained. The mirror is also adjustable relatively to the light bulb so that it may be disposed at the most convenient angle and for the further purpose of varying to some extent the angle of projection of the transmitted rays. The connection between the base and the lamp proper supported thereon permits, without the use of thumb screws or other unsightly adjustment controlling means, the forward and backward tilting of the lamp while at the same time firmly retaining it against objectionable sidewise tilting. The lamp socket, the reflecting shell and the lamp support are rigidly and durably connected into an assembly which will not become loose or be liable to breakage in shipment or use. An auxiliary mirror, detachably connectible at will with the permanent mirror, affords provision for the employment by the user of a plane or a magnifying mirror at will and with a minimum of effort in making the change from one type to the other.

Other objects and advantages of my invention should be readily appreciated as the same becomes better understood by reference to the following description when considered in connection with the accompanying drawings.

Referring to the drawings:

Fig. 1 is a front elevation of a mirror embodying my invention;

Fig. 2 is a side elevation thereof;

Fig. 3 is also a side elevation, showing the lamp adjusted to a different position with respect to the base;

Fig. 4 is a vertical sectional view through the lamp taken on the line 4—4 of Fig. 1;

Fig. 5 is a fragmentary sectional view on the line 5—5 of Fig. 4;

Fig. 6 is a detail sectional view on the line 6—6 of Fig. 4;

Fig. 7 is a detail sectional view on the line 7—7 of Fig. 4;

Fig. 8 is a side elevation with a portion of the reflector shell broken away and showing the application of the auxiliary mirror;

Fig. 9 is a rear view of the permanent mirror illustrating the manner of attachment of the auxiliary mirror thereto; and Fig. 10 is a fragmentary sectional view through the auxiliary mirror taken on the line 10—10 of Fig. 9.

Referring now to the drawings more in detail, reference character 11 indicates generally the base of the device which may be stamped from sheet metal or otherwise constructed and provided preferably with a bottom piece 12 of material which will not mar the surface of the furniture upon which the lamp may be set. Electric wires 13 enter the base, where they are connected with a switch adapted to be manipulated by an accessible button 14, or otherwise, for turning the current on or off. Beyond the switch the wires pass upwardly through the base and the adjustable lamp support and are connected with the respective terminals of a usual lamp socket indicated generally at 15, the structural details of which may be of any suitable form.

The lamp socket 15 is mounted in a housing 16 preferably formed of sheet metal, an insulating sleeve 17 being interposed between the housing and the perimeter of the socket. The lower portion of the housing is tapered inwardly as indicated at 18 and rests upon a shoulder 19 of the pivot member 21. One or more insulating washers 22 is disposed over the inturned supporting flange of the housing 16, and the housing is firmly clamped between these washers and the shoulder 19 by screwing a clamping ring 23 snugly down upon the externally threaded upper end of the pivot member 21. This clamping ring, as will be apparent from Figs. 4 and 5, has a pair of upstanding lugs or ears 24 which are embraced by opposed inwardly bent extensions 25 of metal arms 26 struck downwardly from the metal of the light socket 15. In this manner the socket is firmly connected with the clamping ring 23 so that turning movements of the socket will screw this clamp ring downwardly on the pivot member 21 to snugly clamp the housing 16 to the pivot member, thereby establishing a sturdy, rigid connection.

It will be apparent from Figs. 4 and 5 that the pivot member 21 is hollow to accommodate the electric wires and that it is arcuate or globular in form from front to rear while the side faces thereof are flat, as is illustrated best in Fig. 5. These flat faces fit loosely but fairly snugly between the opposed upstanding lugs or fingers 27 of a socket member 28 shaped to provide a shoulder 29 adapted to rest upon the top of the base 11 and a cylindrical portion projecting downwardly through an opening in the base top and adapted to receive a nut 31 which when tightened up firmly locks the member 28 to the base 11. The upwardly projecting portion of the lugs 27 is externally threaded for the reception of a sleeve 32, having at its upper end an inturned flange 33. When the sleeve is screwed down into the position illustrated in the drawings, this flange engages the upper arcuate surfaces of the pivot member 21 so as to hold this member against displacement from between the lugs 27. A spring 34 disposed in the member 28 beneath the pivot member 21 exerts an upward thrust on the member 21, a washer 35 between the spring and this member serving as a thrust washer.

It will be apparent that the pivot member is free to swing forwardly and backwardly between the lugs 27 but is held against sidewise tilting movement by these lugs and that the thrust of the spring 34 induces sufficient friction upon the member 21 to hold it and the structure carried thereby in any tilted position to which it may be adjusted.

The upper portion of the housing 16 is proportioned to extend through an opening in the reflector shell 36 which is rigidly connected to the housing by spinning the metal of the housing into clamping engagement with the surrounding margins of the opening through which the housing projects, as indicated by reference character 37. The reflector is shaped as shown in Figs. 1 to 3, inclusive, and is of sufficient size to permit the insertion of a light bulb 38 into the socket 15.

To the lower portion of the reflector shell, forwardly of the socket, a stud or eye 39 is secured, preferably in the manner shown in Figs. 4 to 6 from which it will be observed that the base of the stud is internally threaded for the reception of a screw 41 and the perimeter is notched as indicated at 42 to receive the prongs of a holding washer 43 which pass through perforations in the shell so as to lock the eye against turning movements relatively to the shell. A pair of spaced ears 44 are adapted to engage opposite faces of the perforated stud 39, and frictional engagement of these ears with the stud is effected by a coil spring 45 disposed within a hollow nut 46 theraded on to a pintle 47 which passes through the ears and the stud, as best shown in Fig. 6. The ears may, therefore, be rotatably adjusted relatively to the stud about the pintle 47 as an axis.

These ears are secured to the lower portion of a mirror frame 48 which carries a mirror 49, either plane or concave as preferred. The size of the mirror may vary but preferably it is proportioned relatively to the reflector shell approximately as illustrated in Fig. 1 and it will be observed that the mirror is directly in front of the light bulb 38 so as to intercept the direct rays from the bulb, thereby shielding the eyes of the observer while the face or other object to be reflected in the mirror is illuminated by the indirect rays issuing around the mirror.

It will be apparent that the mirror may be tilted forwardly and backwardly relatively to the reflector and the assembly including the reflector. The light bulb and the mirror may be tilted forwardly and backwardly as a unit upon the base 11, thereby affording a wide range of adjustability of the device as a whole and of the mirror independently to accommodate the lamp to the convenience of the user.

For some purposes a plane mirror is most suitable, while for others a concave magnifying mirror is preferable. My invention is designed to satisfy both of these requirements and to that end supplies both a plane and a concave mirror, either of which may be used at will. In the form of the invention illustrated, the permanent mirror 49 is of the plane type but as will be apparent from Figs. 8 to 10, inclusive, an auxiliary or supplemental mirror 51 carried in a frame 52 may be conveniently substituted for the plane mirror by simply positioning the concave mirror in front of the plane mirror as illustrated in Fig. 8. To retain the concave mirror in operative position in front of the plane mirror, the former is provided with a plurality of hook shaped members 53 which are adapted to hook over the frame 48 of the plane mirror. The supplemental mirror is thereby held in proper position and obviously may be readily removed by simply lifting it up to disengage the hooks and replaced by a reverse operation whenever desired.

The preferred structural details illustrated and described may obviously be varied within considerable limits without departing from the essence of the invention as defined in the following claims.

I claim:

1. A lamp structure comprising a base, a bifurcated supporting member attached to and projecting upwardly from said base, a pivot member having a flat sided circular portion adapted to be disposed between the bifurcations of said supporting member and having an upwardly projecting threaded extension, a sleeve threaded on said supporting member for retaining the pivot member in position, yieldable means for retaining the pivot member in adjusted position, a housing carried by the pivot member, a lamp socket within the housing, and means connected to said socket and constructed to cooperate with said threaded extension for securing the housing to said pivot member.

2. An article of the character described comprising a base, a pivot member carried thereby, means for securing said pivot member to the base so as to permit tilting movements of said member in one vertical plane only, a lamp socket and a reflector shell carried by said pivot member, a mirror, a support carried by and disposed entirely within said shell, and a cooperating support projecting rearwardly from said mirror adjustably carried by said first support to permit adjustment of said mirror to various inclinations with respect to said shell and lamp socket.

3. A structure of the character described comprising a base, a lamp socket and an open sided reflector shell adjustably mounted on said base so as to be capable of tilting movements relatively thereto, a lamp bulb in said socket disposed within the shell, a pivotal supporting stud disposed within the shell, means including a screw and a pronged washer extending through the wall of the shell and engaging said stud for securing said stud to the shell against rotative movements, a mirror of smaller diameter than the shell, and means including a pintle and a friction device for adjustably mounting said mirror on said stud to dispose the mirror wholly within the confines of said shell and to permit adjusting movements of the mirror relatively to the shell.

4. A structure of the character described comprising a base, a cylindrical housing adjustably mounted thereon, a lamp socket disposed within said housing and electrically insulated therefrom, a reflector shell fixed to and carried by said housing, a mirror, and adjustable supporting means disposed within and carried by said shell for adjustably supporting said mirror upon a fixed pivot within the shell.

5. A lamp structure comprising a base, a housing adjustably mounted thereon, means for frictionally retaining said housing in adjusted positions, a lamp socket associated with and electrically insulated from said housing, a reflector shell carried by the housing, a mirror, and means including a fixed pivot disposed within and carried by said shell for adjustably supporting said mirror.

6. A lamp structure comprising a base, a bifurcated, externally threaded supporting member secured to and projecting upwardly from said base, a pivot member interposed between the bifurcations of said supporting member, an open ended sleeve threaded over said supporting member and embracing said pivot member for preventing withdrawal of said pivot member from said supporting member but permitting pivotal movement of said pivot member in one vertical plane only, yieldable means for frictionally retaining said pivot member in adjusted position, a housing carried by said pivot member, a reflector shell carried by the housing, a lamp socket within the housing, and a lamp in said socket.

EDWIN W. NORTH.